United States Patent [19]
Lee

[11] Patent Number: 6,082,010
[45] Date of Patent: *Jul. 4, 2000

[54] STAGE APPARATUS HAVING ROTARY TABLE

[75] Inventor: Hyung-seok Lee, Changwon, Rep. of Korea

[73] Assignee: Samsung Aerospace Industries, Ltd., Kyongsangnam-do, Rep. of Korea

[ * ] Notice: This patent issued on a continued prosecution application filed under 37 CFR 1.53(d), and is subject to the twenty year patent term provisions of 35 U.S.C. 154(a)(2).

[21] Appl. No.: 09/075,788

[22] Filed: May 12, 1998

Related U.S. Application Data

[63] Continuation of application No. 08/620,837, Mar. 20, 1996, abandoned.

[30] Foreign Application Priority Data

Mar. 20, 1995 [KR] Rep. of Korea .......................... 95-5788

[51] Int. Cl.⁷ ................. B23Q 3/18; G01B 7/00
[52] U.S. Cl. ............... 33/1 M; 33/569; 33/573; 33/DIG. 2; 269/73
[58] Field of Search .................... 33/1 M, 1 N, 1 PT, 33/568, 569, 573, 613, 645, DIG. 2; 269/73, 71, 58, 72, 309

[56] References Cited

U.S. PATENT DOCUMENTS

| | | |
|---|---|---|
| 2,595,137 | 4/1952 | Hagopian . |
| 3,831,283 | 8/1974 | Pagella et al. ........................ 33/DIG. 2 |
| 3,990,689 | 11/1976 | Eklund, Sr. . |
| 4,129,291 | 12/1978 | Kato et al. ................................ 269/73 |
| 4,234,175 | 11/1980 | Sato et al. . |
| 4,578,606 | 3/1986 | Welterlin ................................. 310/156 |
| 4,887,804 | 12/1989 | Ohtsuka . |
| 4,896,869 | 1/1990 | Takekoshi ................................. 269/71 |
| 4,909,474 | 3/1990 | Buchler et al. . |
| 4,953,306 | 9/1990 | Weckenmann et al. .................. 33/1 M |
| 5,518,550 | 5/1996 | Korenaga et al. ......................... 269/73 |
| 5,760,500 | 6/1998 | Kondo et al. ............................. 33/1 M |

*Primary Examiner*—Christopher W. Fulton
*Attorney, Agent, or Firm*—Finnegan, Henderson, Farabow, Garrett & Dunner, L.L.P.

[57] ABSTRACT

A stage apparatus having a rotary table and a method of operating the same are provided. The stage apparatus includes a base, a stage which is rectilinearly movable on the upper surface of the base, and a rotary table which is rotatable on the stage and on which a workpiece is to be placed. Therefore, a larger workpiece can be effectively manufactured using the stage apparatus.

6 Claims, 4 Drawing Sheets

STAGE APPARATUS HAVING ROTARY TABLE

This is a continuation of application Ser. No. 08/620,837, filed Mar. 20, 1996 now abandoned.

FIELD OF THE INVENTION

The present invention relates to a stage apparatus having a rotary table and to a method of operating the same. More particularly, it relates to a stage apparatus having a rotary table, which is commonly used in a three-dimensional precision measuring device or a precision machining device, and to a method of operating the same.

BACKGROUND OF THE INVENTION

An X-Y stage apparatus (hereinafter, referred to as a stage apparatus) is an essential equipment for transferring, or moving, a workpiece during a precision manufacturing process. Since the precision manufacturing can be successfully performed only when the transfer of the workpiece is strictly controlled, research for improving the performance of the stage apparatus has been concentrated on a guiding apparatus and a driving method therefor. Also, difficulties in the development and manufacturing of a precision guide or bearing are other reasons why the research is concentrated thereon.

FIG. 1 is a perspective view of a conventional stage apparatus and FIG. 2 is a diagram illustrating a manufacturing process consisting of an exposing process using the stage apparatus shown in FIG. 1. In the example of FIGS. 1 and 2, a workpiece is an exposing plate P of a liquid crystal display (LCD) device. The conventional stage apparatus is transferred straightly along X- and Y-axes on a horizontal surface. In FIG. 1, the exposing plate P is placed on a stage 11. Here, "L" represents the lengths of the exposing plate P in the horizontal and vertical directions. Also, a portion enclosed by dotted lines represents an area (m×m) which can be exposed through only one irradiation process. Thus, if it is intended to expose the whole area of the exposing plate P of the LCD, the stage 11 should move in the X- and Y-directions as much as (L–m) as shown in FIG. 2.

In the above-described conventional stage apparatus, if a workpiece to be exposed is large, the stage apparatus must be enlarged according to the size of the workpiece. Thus, it is inevitable to replace the stage apparatus with a more suitable one. However, there are difficulties and high costs associated with manufacturing the large stage apparatus. Therefore, a stage apparatus which is adaptive for changes in the size of the workpiece is desirable.

SUMMARY OF THE INVENTION

It is an object of the present invention to provide a stage apparatus having a rotary table which enables the manufacturing of a large workpiece.

It is another object of the present invention to provide a method of operating the stage apparatus having a rotary table.

In accordance with one aspect of the invention, there is provided a stage apparatus comprising: a base; a stage which is rectilinearly movable on the upper surface of the base; and a rotary table which is rotatable on the stage and on which a workpiece is to be placed.

Preferably, the stage apparatus further comprises rotation guiding means placed at the bottom surface of the rotary table for guiding the rotation of the rotary table, and a receiver formed at the center of the stage for receiving the rotation guiding means.

Additionally, the stage apparatus preferably further comprises a plurality of first air outlets on the upper surface of the stage, which function as a bearing when the rotary table rotates on the stage, wherein the first air outlets and the receiver are connected to an air compressor.

Also, it is preferred that the stage apparatus comprises a ball bearing or a journal bearing, which function as a bearing when the rotary table rotates on the stage.

It is also preferred that the stage apparatus comprises a plurality of second air outlets at the bottom surface of the stage, which function as a bearing when the stage rectilinearly moves on the base, wherein the second air outlets are connected to an air compressor.

Still further, the stage apparatus also comprises rotating means for generating rotational force for rotating the rotary table on the stage, the rotating means including a plurality of first stage inductors formed on the upper surface of the stage around the receiver, and a plurality of first stators formed at the bottom surface of the rotary table around the rotation guiding means.

It is further preferred that the stage apparatus comprises driving means for generating force for rectilinearly moving the stage on the base, the driving means including a plurality of second stage inductors provided at the bottom surface of the stage, and a plurality of second stators provided at the upper surface of the base.

Also, in accordance with a second aspect of the invention, there is provided a method of operating the above stage apparatus having the base, the stage and the rotary table, comprising the steps of performing a predetermined machining process to a workpiece while rectilinearly reciprocating the stage on the base in a first predetermined stroke distance, rotating the rotary table on the stage in a predetermined angle, and performing the predetermined machining process to the workpiece while rectilinearly reciprocating the stage on the base in a second predetermined stroke distance.

Preferably, the rotary table is rotated by 180° in the rotating step. Also, in some applications it may be more preferable that the rotary table is rotated by 90° in the rotating step.

BRIEF DESCRIPTION OF THE DRAWINGS

The above objects and advantages of the present invention will become more apparent from the following description of preferred embodiments thereof with reference to the attached drawings in which.

DESCRIPTION OF PREFERRED EMBODIMENTS OF THE INVENTION

Figure 1:
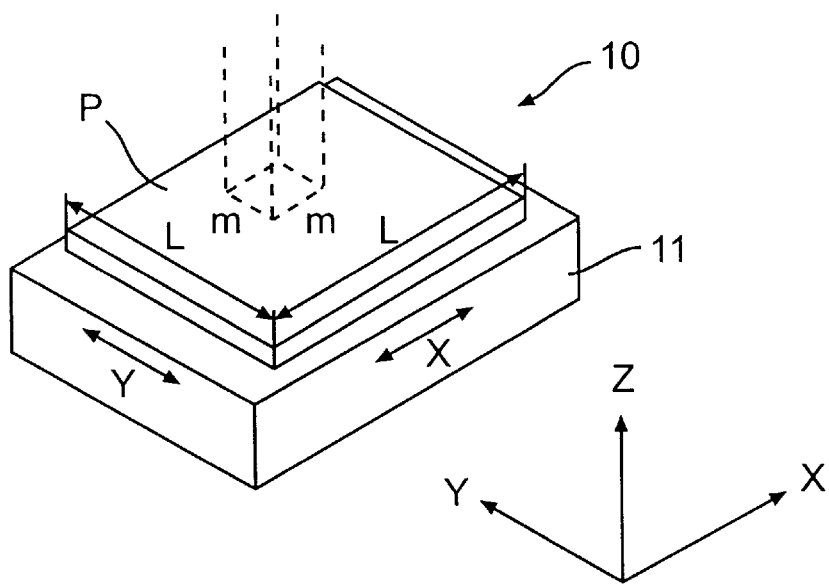
FIG. 1 is a schematic perspective view of a conventional stage apparatus.
Figure 2:
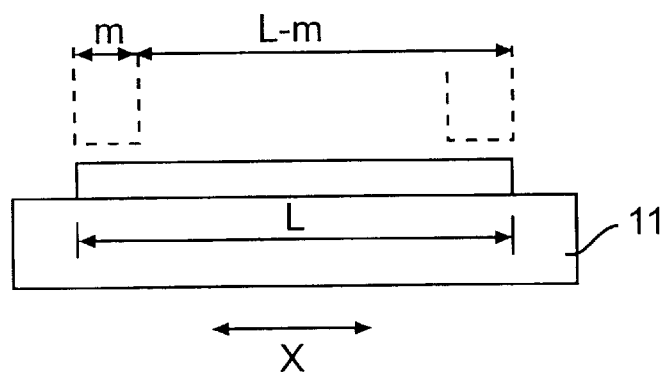
FIG. 2 is a diagram illustrating an exposing process using the stage apparatus of FIG. 1.
Figure 3:
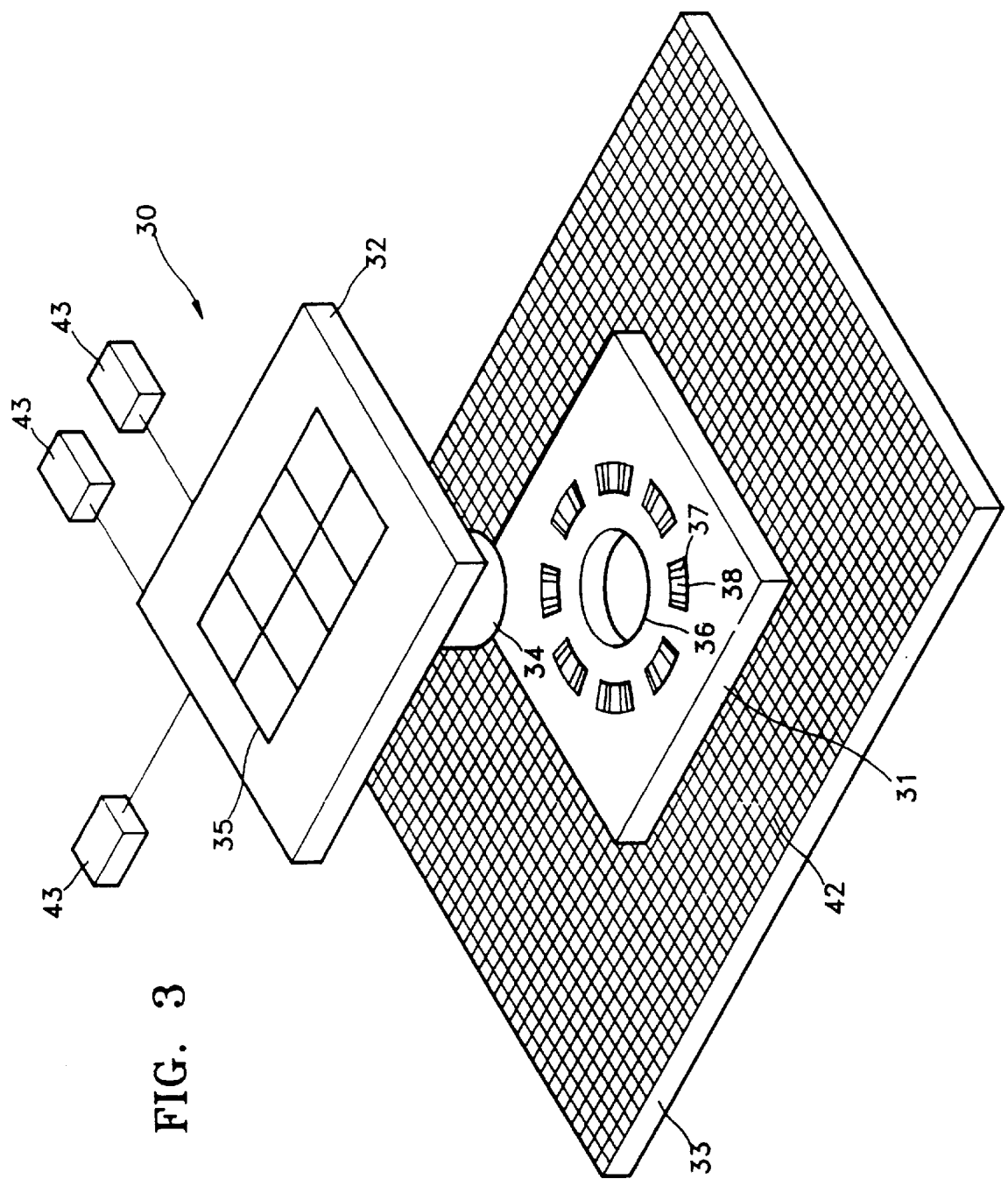
FIG. 3 is an exploded perspective view of a stage apparatus according to the present invention.
Figure 4:
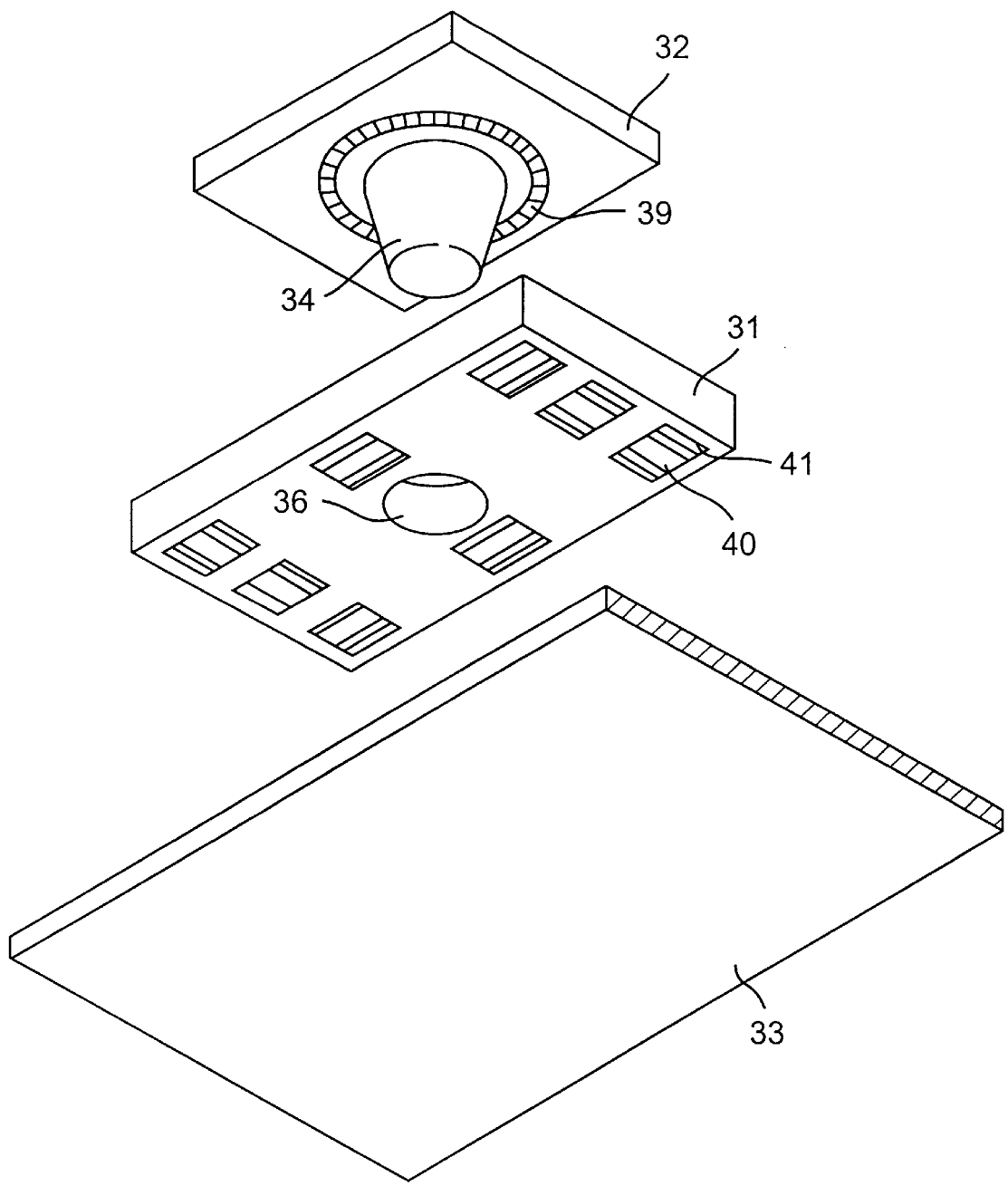
FIG. 4 is an exploded perspective view of the stage apparatus the present invention at another angle.

As shown in FIGS. 3 and 4, a stage apparatus 30 includes a stage 31, a rotary table 32, and a base 33. An exposing plate (not shown) used as a workpiece may be placed on the rotary table 32. The rotary table 32, shown as a hexahedron having a rectangular upper surface in this embodiment, has a rotor 34 which is coupled to the stage apparatus at the bottom surface thereof as shown in FIG. 4. An absorption hole 35 is formed on the upper surface and is connected to a vacuum source (not shown) to hold the plate made of glass or a similar material on the rotary table 32 using vacuum force generated from the vacuuming source.

The stage 31 has a cylindrical rotor receiver 36 formed at the center thereof, into which the rotor 34 formed at the bottom surface of the rotary table 32 is inserted. Also, a plurality of first air outlets 38 are formed on the upper surface of the stage 31 around the rotor receiver 36, which is connected to an outside air compressor (not shown). When the rotary table 32 rotates, the air provided from the air compressor is ejected up via the first air outlets 38. Here, the air is also ejected up through a gap which is formed between the rotor 34 and the rotor receiver 36. As a result, the rotary table 32 floats lightly on the stage 31, so that the air ejected from the air compressor functions as an air bearing during the rotation of the rotary table 32. Instead of the air bearing, other types of bearing, for example, a ball bearing, a journal bearing, or the like can be used. Adjacent to the first air outlets 38, a plurality of first stage inductors 37 for rotating the rotary table 32 are provided on the stage 31 around the circumference of the rotor receiver 36 as shown in FIG. 3. As is well known in the art, an induct is a, "device for introducing inductance in to a circuit." Inductance is, "that property of an electric circuit or of two neighboring circuits whereby an electromotive force is induced (by the process of electromagnetic induction) in one of the circuits by a change of the current in either of them." *McGraw-Hill Encyclopedia of Electronics and Computers, fifth edition* 410–413 (McGraw-Hill 1984). The first stage inductors 37 function as a rotating means for rotating the rotary table 32, in cooperation with a plurality of stators 39 formed at the bottom surface of the rotary table 32 around the rotor 34. Thus, the rotary table 32 rotates while being floated lightly over the stage 31 by air.

The base 33 is placed below the stage 31. As shown in FIG. 4, a plurality of second air outlets 40 are provided at the bottom surface of the stage 31. The air provided from the outside air compressor (not shown) is ejected down via the second air outlets, that is, toward the base 33. This air ejection from the bottom of the stage 31 toward the base 33 lightly floats the stage 31 over the base 33, that is, it functions as an air bearing when the stage 31 rectilinearly reciprocates on the base 33. As shown in FIG. 3, a plurality of base stators 42 are provided on the whole upper surface of the base 33, for rectilinearly moving the stage 31 on the upper surface of the base 33, in cooperation with a plurality of second stage inductors 41 formed at the bottom surface of the stage 31.

Here, since the rotating and rectilinear movements of the rotary table 32 and the stage 31 should preferably be precisely controlled, a position detecting device 43 such as an interferometer and an automatic focus sensor preferably are provided to precisely set a position to be exposed.

Figure 5:
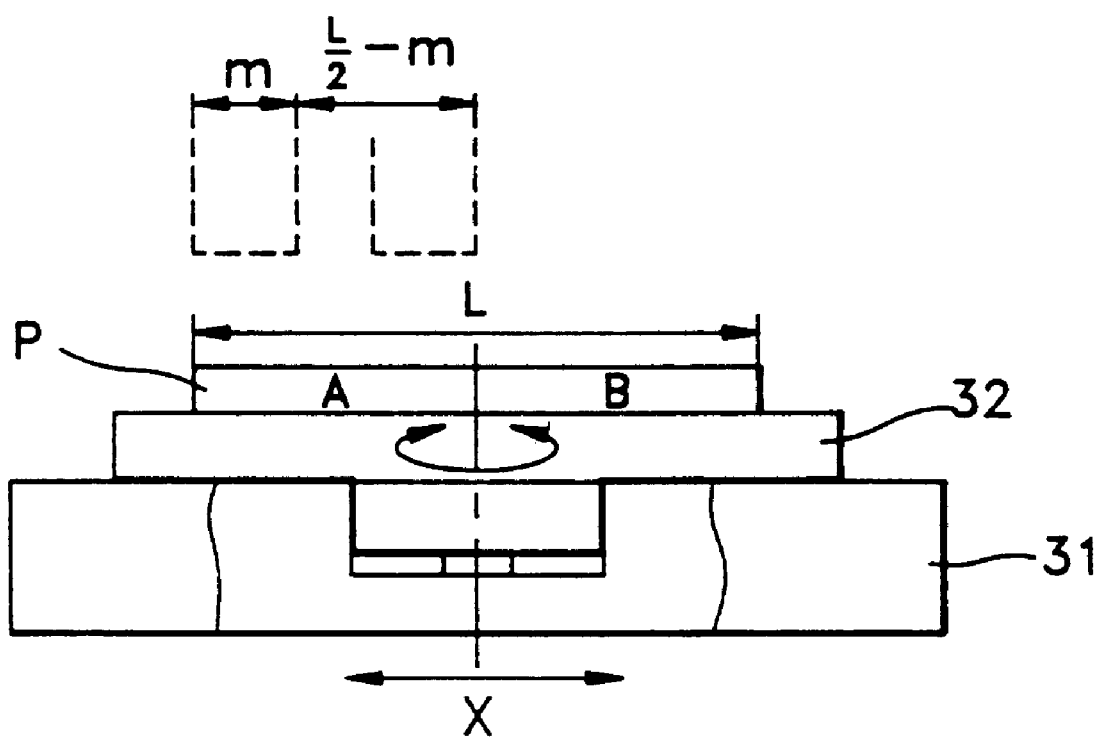
FIG. 5 is a diagram of illustrating the exposing process using the stage apparatus of FIG. 3.

FIG. 5 is a diagram illustrating an exposing process using the stage apparatus shown in FIGS. 3 and 4. It is supposed that a plate P having horizontal and vertical lengths of "L" is exposed using the exposing apparatus capable of exposing (m×m) area per one irradiation process. First, the exposing plate P is placed on the rotary table 32. Here, it is preferable that an intersection of two diagonal lines of the exposing plate P matches with a center of the rotation of the rotary table 32. In order to expose a portion "A" of the exposing plate P, corresponding to a half of the whole area, the stage 31 reciprocates in the X-direction by a stroke distance of $$\left(\frac{L}{2} - m\right),$$

and in the Y-direction by a stroke distance of (L−m), respectively. Then, the rotary table 32 rotates by 180° to place a portion "B" of the exposing plate P, which is not exposed, below the exposing apparatus. Thereafter, as in the case of the portion "A", the stage 31 reciprocates in the X- and Y-directions by stroke distances of $$\left(\frac{L}{2} - m\right),$$

and (L−m), respectively, thereby exposing the other remaining half area "B" of the exposing plate P. Thus, according to the stage apparatus 30 having the rotary table 32 of the present invention, the X-directional stroke distance of the stage 31 is reduced by $$\frac{L}{2},$$

compared with the conventional stage apparatus 10 without a rotary table in which the X-directional stroke distance of the stage 11 is equal to (L−m). That is, if the X-directional stroke distance is equal to (L−m) in the stage apparatus 30 having the rotary table 32, like the conventional stage apparatus, an exposing plate with X-directional length of 2L can be exposed using the stage apparatus. Further, if the exposing plate is exposed by a quarter of the area while rotating the rotary table by 90° instead of 180°, an exposing plate with Y-directional length of 2L can be exposed. In other words, if the stage rectilinearly reciprocates over the same stroke distance as that of the conventional stage for the exposing process, the area of the plate to be exposed using the stage apparatus having the rotary table of the present invention increases by four times, compared with the conventional stage apparatus. Also, even if the exposing plate is not in square or the center of the plate does not match with the center of the rotation of the rotary table, the stage apparatus of the present invention can be used for exposing a larger plate through both rotating and rectilinear movements of the stage.

The stage apparatus of the present invention is described with reference to an exposing apparatus. However, it is to be understood that the stage apparatus may be applied to other equipment in other manufacturing processes using the above-described stage apparatus, especially, to a three-dimensional precision measuring device or a precision machining device. That is, a larger workpiece can be measured or machined by the rotating and rectilinear movements of the stage with a measuring portion of the precision measuring device or a tool of the precision machining device fixed.

Having described preferred embodiments of the invention, it is to be understood that modifications thereof falling within the spirit of the invention may become apparent to those skilled in the art, and the scope of the invention is to be determined by the appended claims and their equivalents.

What is claimed is:

1. A stage apparatus for receiving variously sized workpieces, comprising:

a base having an upper surface;

a stage rectilinearly movable on the upper surface of said base;

a rotary table rotatably positioned on said stage, said table comprising a bottom surface and means for receiving a workpiece;

rotation guiding means placed at the bottom surface of said rotary table for guiding the rotation of said rotary table;

a receiver formed at the center of said stage for receiving said rotation guiding means;

rotating means for rotating said rotary table on said stage, said rotating means including:
  a plurality of first stage inductors formed on the upper surface of said stage, and
  a plurality of first stators formed at the bottom surface of said rotary table around said rotation guiding means, wherein said plurality of first stage inductors cooperate with said plurality of first stators to generate rotational force for rotating said rotary table on said stage; and a plurality of first air outlets on the upper surface of said stage for providing air to function as a bearing when said rotary table rotates on said stage, wherein said first air outlets and said receiver are adapted to be connected to an air compressor.

2. A stage apparatus as claimed in claim 1, further comprising driving means for generating force for rectilinearly moving said stage on said base, said driving means including:
  a plurality of second stage inductors provided at the bottom surface of said stage; and
  a plurality of second stators provided at the upper surface of said base, wherein said plurality of second stage inductors cooperate with said plurality of second stators to generate force for rectilinearly moving said stage on said base.

3. A stage apparatus as claimed in claim 2, further comprising:

position detecting means for detecting the positions of said stage and said base, said position detecting means enabling control of the rotary and rectilinear movement of said rotary table and said stage, respectively.

4. A stage apparatus as claimed in claim 1, further comprising a plurality of second air outlets at the bottom surface of said stage for providing air to function as a bearing when said stage rectilinearly moves on said base, wherein said second air outlets are adapted to be connected to an air compressor.

5. A stage apparatus as claimed in claim 1, wherein said first air outlets and said plurality of first stage inductors are circumferentially provided around the receiver of said stage.

6. A stage apparatus for receiving variously sized workpieces, comprising:

a base having an upper surface;

a stage rectilinearly movable on the upper surface of said base;

a rotary table rotatably positioned on said stage, said table comprising a bottom surface and means for receiving a workpiece;

rotation guiding means placed at the bottom surface of said rotary table for guiding the rotation of said rotary table;

rotating means for rotating said rotary table on said stage, said rotating means including:
  a plurality of first stage inductors formed on the upper surface of said stage, and
  a plurality of first stators formed at the bottom surface of said rotary table around said rotation guiding means, wherein said plurality of first stage inductors cooperate with said plurality of first stators to generate rotational force for rotating said rotary table on said stage; and bearing means adapted to function as a bearing when said rotary table rotates on said stage.

* * * * *